March 5, 1963
J. B. ORR
3,079,630
APPARATUS AND PROCEDURE FOR MAKING EXPANDED
RESINOUS CONTAINERS
Filed June 18, 1959
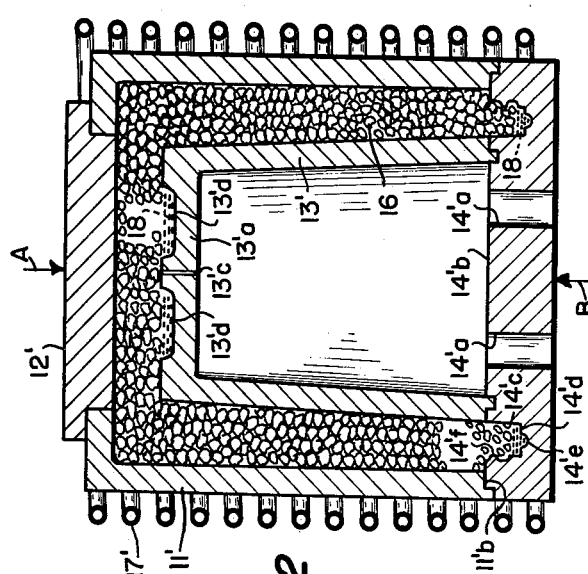
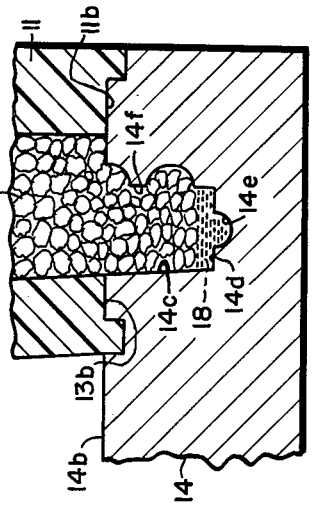
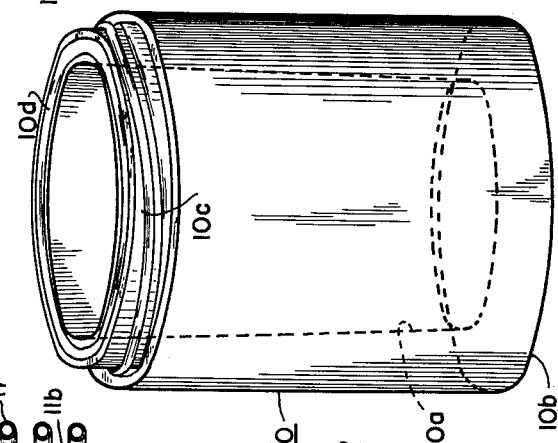
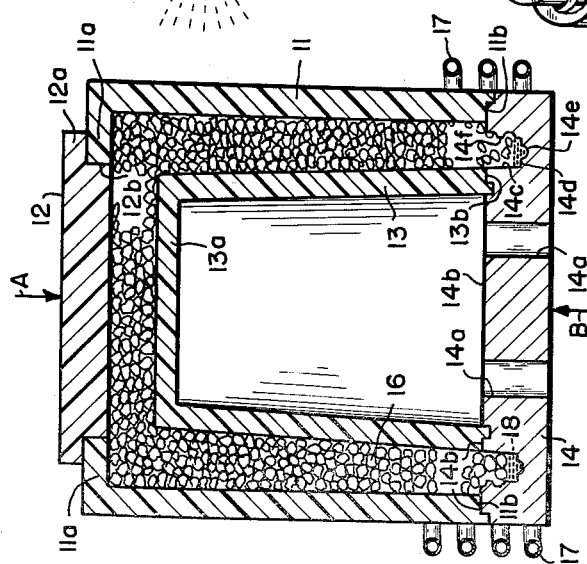
INVENTOR.
John B. Orr
BY Green, McCallister & Miller
HIS ATTORNEYS United States Patent Office
3,079,630
Patented Mar. 5, 1963

3,079,630
APPARATUS AND PROCEDURE FOR MAKING EXPANDED RESINOUS CONTAINERS
John B. Orr, Great Barrington, Mass., assignor to Sheffield Plastics, Inc., Sheffield, Mass., a corporation of Massachusetts
Filed June 18, 1959, Ser. No. 821,304
4 Claims. (Cl. 18—5)

This invention relates to making relatively lightweight shapes or articles in the nature of containers from expandable resinous or plastic materials, and particularly to improved mold apparatus and procedure employed in making them.

It is well known that expandable resin beads, such as polystyrene and pre-expanded polystyrene beads, may be formed or molded into useful articles by placing the beads in a mold cavity and injecting steam into such cavity to heat the beads, expand them and cause them to adhere to one another to thereby form a composite article, such as a jar or container. After the steam injection, the plastic or resin must be cooled before the molds are removed to prevent further expansion of the beads and to provide a desired surface finish. Heretofore, it has been customary to introduce or inject the steam through passageways or holes in the mold wall by means of steam connection thereto. This has been found to be particularly troublesome in production molding of shapes where the molds are to revolve on a table and also when the table, itself, is to revolve.

Further, I have found that the holes in the walls of the molds tend to become plugged with the resin material during the steam injection thereof, decreasing its effectiveness and resulting in an imperfect or incompletely formed shape. In addition, during the cooling operation, there is a tendency for the plastic to flow into the passageways or holes and form pin points or pips which must be removed from the finished article after the shapes have been removed from the molds.

It has thus been an object of my invention to solve the problem presented in connection with steam connections to and steam passageways in molds employed for forming expanded resinous or plastic shapes;

Another object of my invention has been to provide a self-contained steam system for expanding and shaping the resin beads in a mold;

A further object of my invention has been to provide an improved heating and conditioning procedure and mold structure therefor in forming expanded relatively lightweight molded resinous shapes;

These and other objects will appear to those skilled in the art from the illustrated embodiments and the description thereof.

In the drawings,

FIGURE 1 is a somewhat diagrammatic vertical section in elevation through a mold construction and heating arrangement employing the principles of my invention and illustrating procedure involved in forming an open mouth shape from resin beads;

FIGURE 2 is a view similar to and on the scale of FIGURE 1 illustrating a modified mold and heating arrangement and modified procedure employed in connection therewith;

FIGURE 3 is an enlarged fragmental section in elevation of a lower corner portion of the mold construction of FIGURE 1, emphasizing details of such construction; and FIGURE 4 is a vertical view in elevation of a finished expanded resin shape or article constructed in accordance with my invention.

In FIGURE 4 I have illustrated a shape or container made of expanded resin beads or pellets of a material, such as polystyrene, having a cavity 10a that is open to one mouth (top) end of the container or jar and which is defined by a relatively cylindrical vertical wall and a bottom wall 10b which closes off its bottom end. The other end of the container 10 has, as shown, a latching neck or threaded portion 10c that is inwardly-offset with respect to the outer wall to define a rim edge thereabout and which terminates in a sealing lip edge 10d.

In carrying out my invention, I provide the mold or its parts with a portion adapted to receive a steam-producing liquid, such as water, of a requisite quantity for expanding the resin beads and heat-forming them into the desired shape of finished article or container. The resin beads are then placed in the mold, the mold closed, and the water is heated by suitable means, such as induction heating. In the latter step, the water becomes converted into steam, thus further expanding, melting and shaping the resinous material ino the desired type of composite article or product.

I have found that the application of an intense heat, such as provided by induction heating, for about 15 to 45 seconds is sufficient. After the shape is formed, it is then permitted to cool in the mold, as by applying a stream of cooling water or by immersing the mold in a water bath and until the shape, itself, has cooled to a temperature of about 130° F. At this time, the mold parts may be opened and the shape ejected or removed.

In the embodiment of my invention shown in FIGURES 1 and 3, I provide heating liquid 18 in a reservoir of a base part 14 of the mold and make this base part of a metal having a relatively good electrical conductivity, so that it will serve as the secondary portion of an induction heating system.

In the embodiment of FIGURE 2, I have shown all of the mold parts of a conductive material, so as to provide a substantially overall heating effect and have further illustrated a reservoir for steam-providing liquid 18 in the top wall or base 13'a of an inner or male mold part 13'.

Employing a high frequency induction heating method, I show hollow water-cooled copper pipes 17, see FIGURE 1, which serve as the primary coil of a rapidly alternating electric field (a frequency of about 1000 cycles is sufficient) and employ at least one of the mold parts, such as the base part 14, to serve as the secondary in which magnetic flux generated by the primary causes heat to be developed therein due to its electrical resistance. This, of course, causes the liquid or water in the base part to become vaporized and to pass through the hollow, sealed-off molding chamber portions of the mold and about resin beads positioned therein to cause them to expand and melt into a composite shape. It will be noted that the mold cavity includes that portion thereof within which the liquid previously was contained. This differs from the ordinary induction heating method employed for metals, in that the resin which is the charge is not, itself, a part of the electrical circuit, but at least one portion of the mold becomes a secondary of the circuit and applies heat directly to a liquid contained therein.

In FIGURES 1 and 3, the base mold part 14 may be of a suitable conductive material, such as iron, copper, or aluminum or a suitable alloy, while its male or inner mold part 13, its outer female mold part 11, and its top or closure mold part 12 may be of a suitable material of poor conductivity, such as stainless steel or an epoxy resin. The primary 17 of the induction heating system is positioned adjacent to and about the lower part 14 to effect the heating operation.

The outer or female mold part 11 may be of a suitable partible or hinged type to facilitate removal of the finished shape, and is shown provided with an offset bottom portion 11b that cooperates with a complementary offset interfitting portion 14b of the base part 14 to retain the parts in a sealed relationship with respect to each other. The part 11 also has an inwardly-projecting top flange or rim portion 11a that interfits with portions 12a and 12b of the top part 12 to maintain them in an aligned and sealed relationship. During the actual forming operation, an endwise force may be applied to the parts 12 and 14, as indicated by the arrows A and B, to retain the sealed relationship.

The part 14 has a downwardly grooved portion, offset or depression 14c that provides a liquid reservoir or chamber and whose base consists of portions 14d and 14e that form a sealing lip edge 10d for the container 10. An outer side wall 14f has female threads to form the latching or threaded portion 10c of the container. In this figure, 18 represents a small quantity of liquid, such as water, which is converted into steam by the heating action of the induction coil 17. A cooling spray head 19 is somewhat diagrammatically shown which is operated after the current to the coil 17 has been shut off and after the resin beads 16 of the mold cavity have been expanded therein to displace the space that was formerly occupied by the liquid 18.

In FIGURE 2, I have shown the mold parts 11', 12', 13' and 14' as all being of a relatively good conducting material, although in accordance with my invention, any one of these parts may be of a non-conducting material. In any event, the parts which contain the liquid or water, such as the parts 13' and 14', should be of a conducting material to quickly vaporize the liquid into steam. In both the embodiments of FIGURES 1 and 2, the base part 14 and 14' is shown provided with vent openings 14a and 14'a at its central portion 14b or 14'b. This is particularly advantageous, not only in aiding the cooling action after the heating has been completed, but also in venting steam from the inside mold if, as shown in FIGURE 2, a steam vent 13'c is provided. This is optional, but may be used where a greater quantity of steam is generated, as shown by the use of the two liquid-containing reservoirs or chambers, one in the part 14' and the other in the end wall 13'a of the inner or male mold part 13'. In this embodiment, the induction coil 17' is shown extending for the full length of the mold construction, but may be broken into two parts, if it is desired to only use the parts 14' and the wall 13'a of the part 13' as secondary portions of an induction heating circuit.

In FIGURE 2, the upper or end wall 13'a is shown provided with a central, circular reservoir or cavity 13'd which is depressed to contain a supply of liquid 18. Since the expanded resin fills this cavity when the beads are expanded, I contemplate providing it with any desired mold shape for producing a desired type of shape or design for the bottom 10b of the finished container. Using the apparatus and method of FIGURE 2, a quicker heating action may be attained and a more intense heating effect by the steam is assured throughout the full extent of the shape being formed. Also, any desired type of differential heating action can be effected by the use of mold parts of different electrical conductivity, by the location of the primary induction coil, etc.

The quantities of liquid, shown in FIGURES 1 and 2, have been found to be satisfactory for producing an article of the size of FIGURE 4. I have found that if, for example, the female portion 11' of the mold is of a highly conductive material, a more shiny and smooth skin is formed along the outer surface of the shape or article. It is apparent that I can produce any desired shape of container or finished article and that the article can be fully formed in one operation, and without the need for steam connections to and passageways through the mold.

In my copending application No. 798,130 of March 9, 1959, entitled "Cap Seal," I have somewhat specifically discussed factors entering into the provision of an expansion-formed resin container of a type that may be provided in accordance with my present invention.

What I claim is:

1. In apparatus for completely and quickly expansion-forming and shaping a composite lightweight container of expanded resin bead construction having surface skin portions of different finish of which one skin portion is more shiny and smooth than the other, the combination of interfititng inner and outer mold parts having wall surfaces defining an enclosed inner mold cavity for receiving pre-expanded resin beads therein, a first of said mold parts having a downwardly-offset portion defining a liquid-receiving reservoir therein that is open upwardly to the mold cavity, said first mold part having a wall of highly electrically-conductive material, a second of said mold parts having a wall of a material of relatively poor electrical conductivity, an electrical induction coil positioned externally about said mold parts and having means quickly-directly inducing substantial heat energy in the wall of said first mold part and vaporizing liquid in its reservoir into steam to thereby quickly heat and expansion-form the pre-expanded resin beads in the mold cavity into a finished article, and said means in combination with the wall materials of said first and second mold parts being constructed and positioned to inhibit directly induced heat in the wall material of said second mold part and provide a sufficient conducted heat differential on the molding cavity defining wall surface thereof with respect to the mold cavity defining wall surface of said first mold part so as to form a more shiny and smooth surface skin portion on the article that is in an abutting relation with respect to the mold cavity defining wall surface of said first mold part than the surface skin portion on the article that is in an abutting relation with respect to the mold cavity defining wall surface of said second mold part.

2. Apparatus as defined in claim 1 wherein, said first mold part is a one-piece bottom end closure part of the interfitting mold parts, and the downwardly-offset portion that defines the reservoir has an annular inner wall surface shaped to form connecting lip and sealing edge portions of the finished article.

3. A process for completely and quickly expansion-forming and shaping a composite lightweight container body having surface skin portions of different finish within a mold chamber defined by interfitting enclosing mold wall parts, one of which mold parts has a downwardly-offset wall portion open to the mold chamber and defining a reservoir therein which comprises in combination, the step of introducing a relatively small quantity of vaporizable liquid into the reservoir, filling the mold chamber with pre-expanded resin beads, providing the one mold part with a highly electrically-conductive wall material, providing an adjacent mold part with wall material of relatively poor electrical conductivity, setting up an electrical induction field about the one and the adjacent mold parts and directly inducing heat energy in the wall material of the one mold part and vaporizing the liquid into steam, moving the steam throughout the mold chamber and quickly and completely expansion-forming and shaping the resin beads into a composite lightweight container body having surface skin portions in shaping-abutment with wall surfaces of the one and the adjacent mold parts, inhibiting the direct inducing of heat energy in the wall material of the adjacent mold part and setting up a differential conducted heat transfer from the wall material of the one and the adjacent mold parts to abutting surface skin portions of the container body, and controlling the differential heat from the one and the adjacent mold parts to form a more shiny and smooth surface on the surface skin portion that abuts the one mold part than on the surface skin portion that abuts the adjacent mold part.

4. A process as defined in claim 3 wherein, the application of the electrical induction heating is effected for a period of about 15 to 45 seconds to form the container body and at a frequency of about 1000 cycles, and the container body is cooled to a temperature of about 130° F. and is then removed from the mold chamber.

References Cited in the file of this patent

UNITED STATES PATENTS

| | | |
|---|---|---|
| 489,318 | Mitchell | Jan. 3, 1893 |
| 1,435,526 | Johnston et al. | Nov. 14, 1922 |
| 1,507,686 | Root | Sept. 9, 1924 |
| 2,226,447 | Smith et al. | Dec. 24, 1940 |
| 2,436,993 | Fisher | Mar. 2, 1948 |
| 2,452,197 | Kennedy | Oct. 26, 1948 |
| 2,898,632 | Irwin et al. | Aug. 11, 1959 |
| 2,954,589 | Brown | Oct. 4, 1960 |

FOREIGN PATENTS

| | | |
|---|---|---|
| 301,477 | Great Britain | Nov. 30, 1940 |

OTHER REFERENCES

"Dylite Expandable Polystyrene," Koppers Co. Inc., copyright 1954, page 19.